(12) United States Patent
Ashbrook et al.

(10) Patent No.: US 9,232,280 B2
(45) Date of Patent: *Jan. 5, 2016

(54) SYSTEM AND METHOD FOR TRANSMITTING A SERVICES LIST TO A PLAYBACK DEVICE

(71) Applicant: Disney Enterprises, Inc., Burbank, CA (US)

(72) Inventors: Jeffrey Ashbrook, North Hollywood, CA (US); Kyle Prestenback, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,844

(22) Filed: Apr. 15, 2015

(65) Prior Publication Data

US 2015/0222957 A1 Aug. 6, 2015

Related U.S. Application Data

(63) Continuation of application No. 13/230,594, filed on Sep. 12, 2011, now Pat. No. 9,071,854.

(51) Int. Cl.

| | |
|---|---|
| *H04N 5/445* | (2011.01) |
| *H04N 21/482* | (2011.01) |
| *H04N 21/222* | (2011.01) |
| *H04N 21/478* | (2011.01) |
| *H04N 21/237* | (2011.01) |
| *G06Q 50/00* | (2012.01) |
| *H04N 21/475* | (2011.01) |
| *H04N 21/4788* | (2011.01) |

(Continued)

(52) U.S. Cl.
CPC .......... *H04N 21/4825* (2013.01); *G06Q 50/01* (2013.01); *H04N 21/222* (2013.01); *H04N 21/237* (2013.01); *H04N 21/4135* (2013.01); *H04N 21/42646* (2013.01); *H04N 21/4431* (2013.01); *H04N 21/4622* (2013.01); *H04N 21/478* (2013.01); *H04N 21/4753* (2013.01); *H04N 21/4788* (2013.01); *H04N 21/858* (2013.01)

(58) Field of Classification Search
CPC . H04N 21/222; H04N 21/478; H04N 21/278; H04N 21/4345; H04N 21/4622; H04N 21/25; H04N 21/434; H04N 21/482
See application file for complete search history.

(56) References Cited

U.S. PATENT DOCUMENTS 6,618,858 B1 * 9/2003 Gautier ........................ 725/132
6,651,251 B1 * 11/2003 Shoff et al. .................... 725/37

(Continued)

*Primary Examiner* — Pankaj Kumar
*Assistant Examiner* — Timothy Newlin
(74) *Attorney, Agent, or Firm* — Farjami & Farjami LLP

(57) ABSTRACT

There is provided a system and method for dynamically transmitting a services list to a playback device. The system comprises a display device, a playback device, and a mediator server with a mediator application. The mediator application is configured to receive, from the playback device, a service request for a services list, to send a services list for presenting on a display device in response to receiving the service request, to receive an activation request for at a third-party service listed in the services list, and to activate the third-party service in response to receiving the activation request. By programming a digital video disc such as a Blu-ray disc according to an API and using such a mediator server, a dynamically adjustable list of third-party services may be supported and used by the playback device without changing the disc application code.

15 Claims, 9 Drawing Sheets

(51) Int. Cl.
*H04N 21/41* (2011.01)
*H04N 21/426* (2011.01)
*H04N 21/443* (2011.01)
*H04N 21/462* (2011.01)
*H04N 21/858* (2011.01)

(56) References Cited

U.S. PATENT DOCUMENTS

| | | | |
|---|---|---|---|
| 7,496,945 B2* | 2/2009 | Rodriguez | 725/51 |
| 7,669,218 B1* | 2/2010 | Groff et al. | 725/50 |
| 8,307,392 B2* | 11/2012 | Ahanger et al. | 725/36 |
| 8,483,547 B2* | 7/2013 | Yokoo | 386/249 |
| 2002/0028672 A1* | 3/2002 | Qi et al. | 455/414 |
| 2002/0199190 A1* | 12/2002 | Su | 725/37 |
| 2003/0005447 A1* | 1/2003 | Rodriguez | 725/51 |
| 2003/0018971 A1* | 1/2003 | McKenna, Jr. | 725/40 |
| 2003/0046700 A1* | 3/2003 | Wilcox et al. | 725/60 |
| 2003/0078972 A1* | 4/2003 | Tapissier et al. | 709/204 |
| 2004/0010806 A1* | 1/2004 | Yuen et al. | 725/136 |
| 2005/0028197 A1* | 2/2005 | White et al. | 725/38 |
| 2007/0101377 A1* | 5/2007 | Six et al. | 725/86 |
| 2007/0107019 A1* | 5/2007 | Romano et al. | 725/80 |
| 2008/0229352 A1* | 9/2008 | Pino et al. | 725/22 |
| 2008/0244676 A1* | 10/2008 | DaCosta | 725/116 |
| 2008/0282312 A1* | 11/2008 | Blinnikka | 725/153 |
| 2009/0100465 A1* | 4/2009 | Kulakowski | 725/39 |
| 2010/0031292 A1* | 2/2010 | Bakker et al. | 725/43 |
| 2010/0064311 A1* | 3/2010 | Cooper | 725/36 |
| 2010/0251292 A1* | 9/2010 | Srinivasan et al. | 725/37 |
| 2010/0287587 A1* | 11/2010 | Patten et al. | 725/39 |
| 2011/0083143 A1* | 4/2011 | Anbananthan | 725/31 |
| 2011/0119079 A1* | 5/2011 | Schoenberg | 705/2 |
| 2011/0131621 A1* | 6/2011 | Brehm et al. | 725/109 |
| 2011/0320739 A1* | 12/2011 | Ragunathan et al. | 711/141 |
| 2012/0036524 A1* | 2/2012 | Mugulavalli et al. | 725/9 |

* cited by examiner

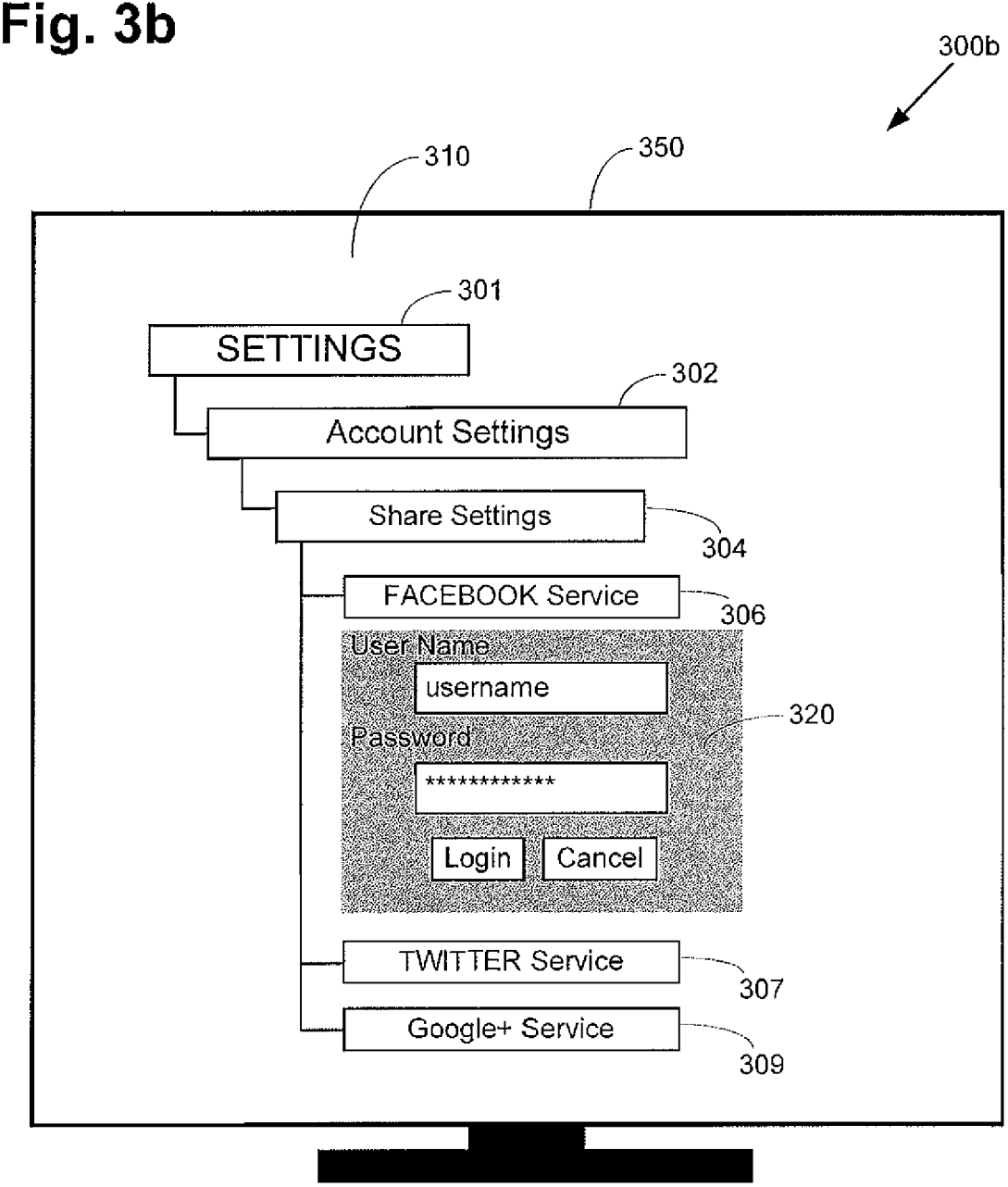

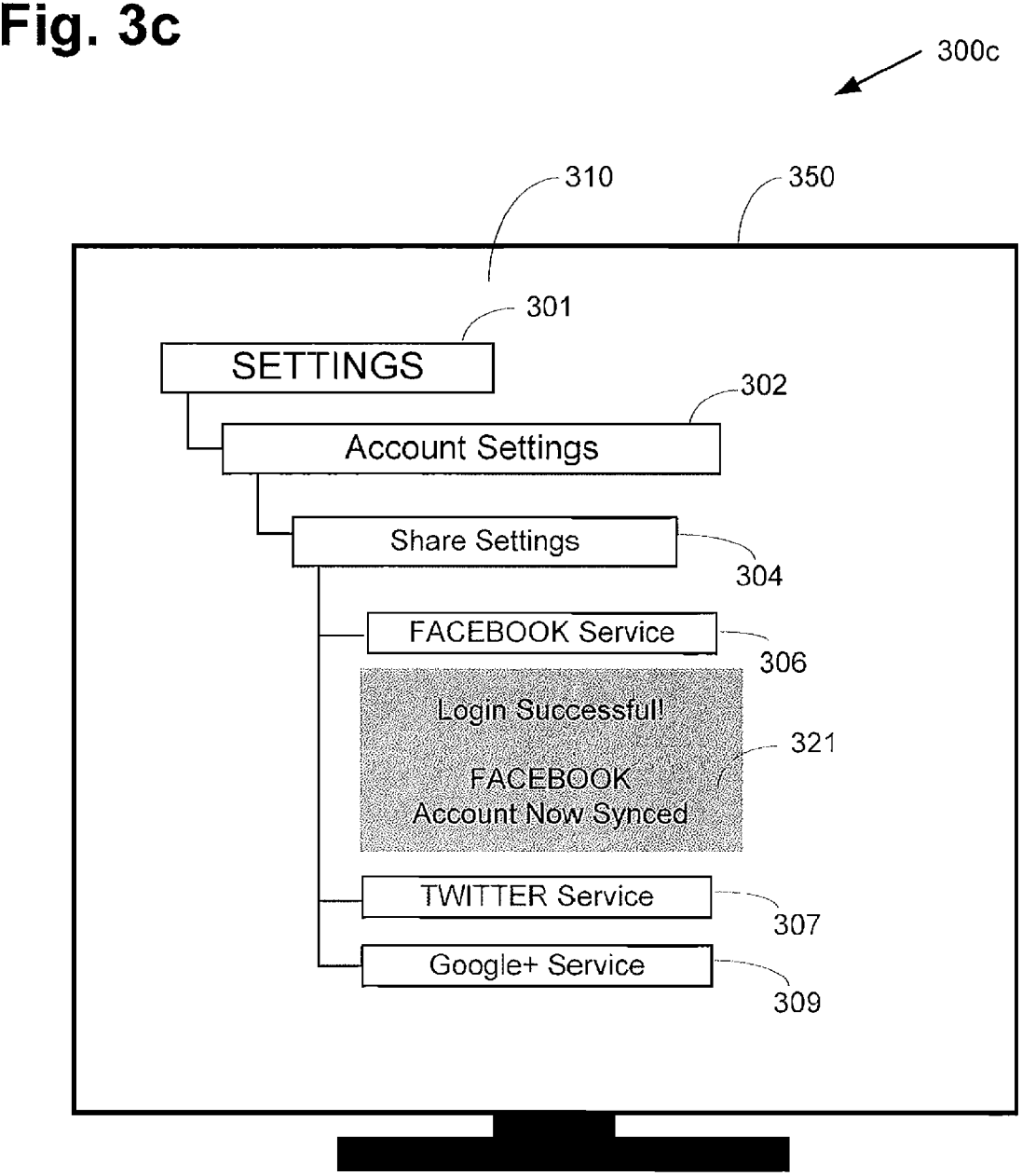

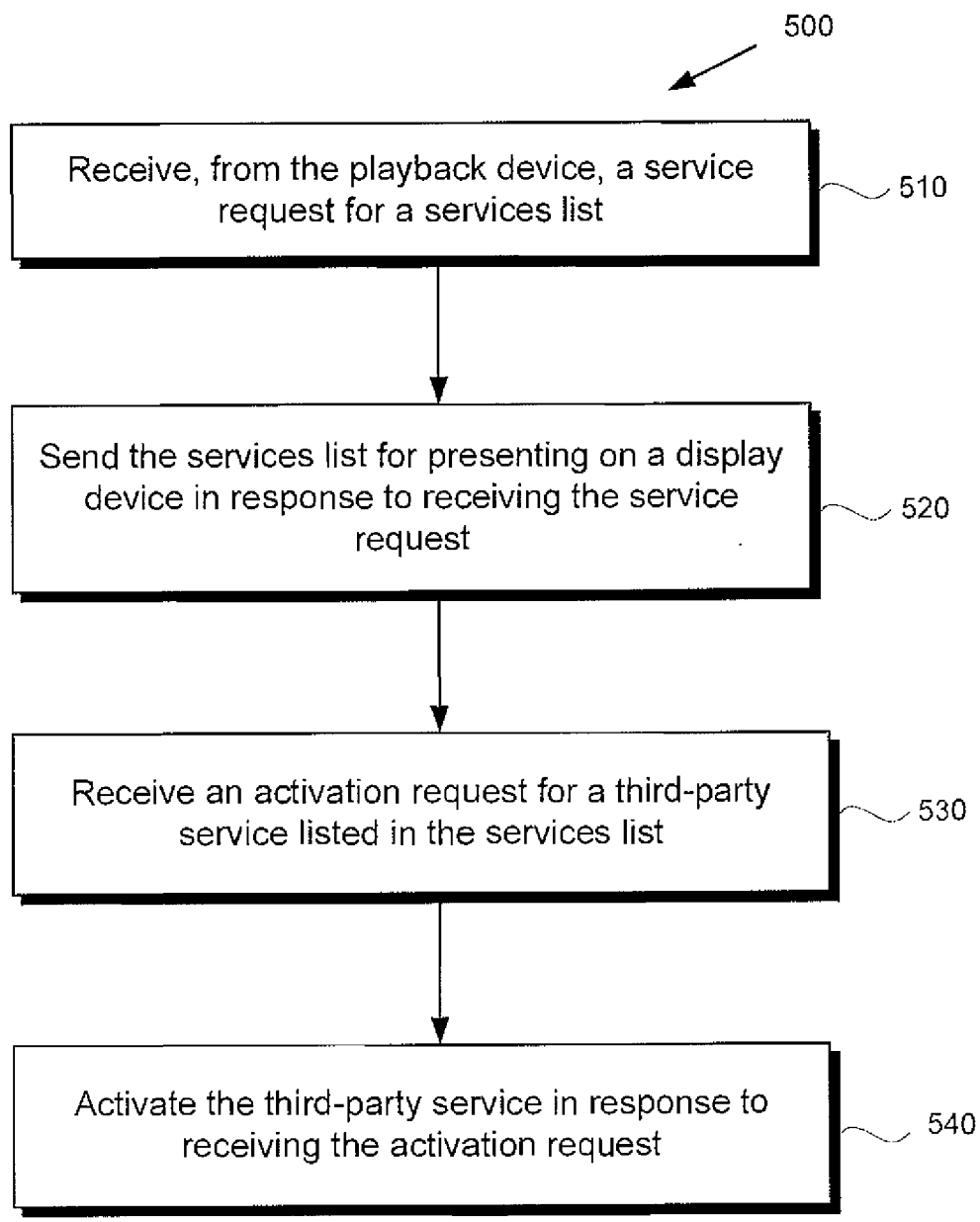

SYSTEM AND METHOD FOR TRANSMITTING A SERVICES LIST TO A PLAYBACK DEVICE

This application is a Continuation of U.S. application Ser. No. 13/230,594, filed Sep. 12, 2011, which is hereby incorporated by reference in its entirety.

BACKGROUND OF THE INVENTION

1. Field of the Invention

The present invention relates generally to transmitting data to a playback device. More particularly, the present invention relates to transmitting a services list to a playback device.

2. Background Art

Blu-ray players and other digital video disc playback devices allow users to connect to the Internet to access additional features and data during playback of Blu-ray Discs and other digital discs. Many digital video discs have incorporated capabilities to allow users to access their accounts on numerous third-party services, including social networking services such as Facebook, Twitter, and Google Plus (Google+).

Presently, a digital video disc, such as a Blu-ray Disc, provides capability for users to access accounts on a fixed number of third-party services. While the availability of new and existing third-party services may change over time, present digital video discs are hard-coded with a fixed set of supported third-party services that may be managed from menu options. In order to gain access to additional third-party services unavailable on a particular digital video disc, users may have to purchase or exchange for newly updated discs with updated support code, which may be costly and inconvenient.

Accordingly, there is a need to overcome the drawbacks and deficiencies in the art by providing a method that provides updated access to third-party services on digital video discs without resorting to replacement discs.

SUMMARY OF THE INVENTION

There is provided systems and methods for transmitting a services list to a playback device, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3b presents a diagram of the menu from FIG. 3a displaying an activation interface for creating an activation request, according to one embodiment of the present invention;

FIG. 3c presents a diagram of the menu from FIG. 3b displaying a login success interface in response to a successful verification of an activation request, according to one embodiment of the present invention;

FIG. 5 shows a flowchart describing the steps, according to one embodiment of the invention, by which a services list may be transmitted to a playback device, according to one embodiment of the present invention.

DETAILED DESCRIPTION OF THE INVENTION

The present application is directed to a system and method for transmitting a services list to a playback device. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
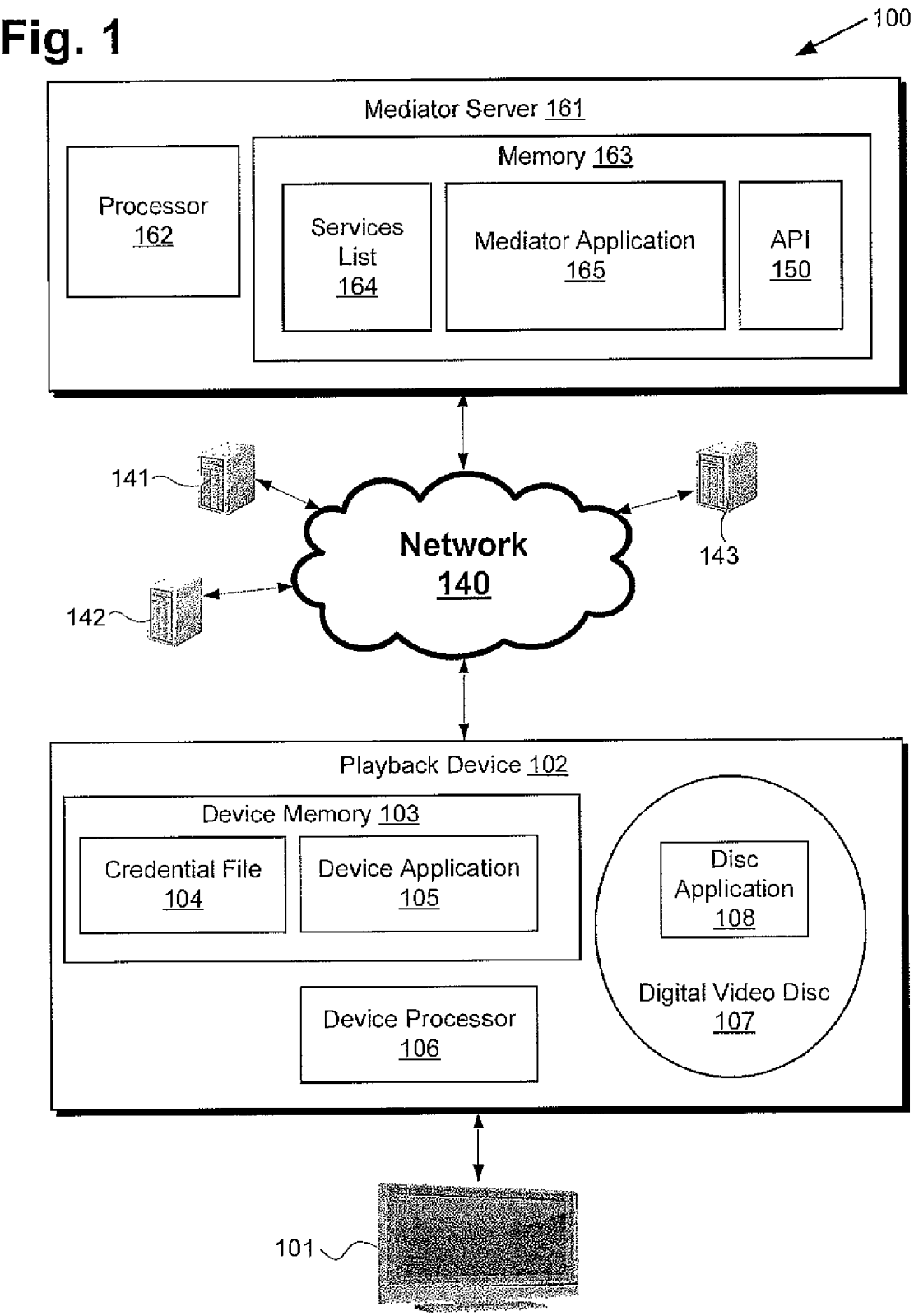
FIG. 1 presents an environment in which a mediator server may support transmitting a services list to a playback device, according to one embodiment of the present invention.

FIG. 1 presents an environment in which a mediator server may support transmitting a services list to a playback device, according to one embodiment of the present invention. Environment 100 includes display device 101, playback device 102, network 140, servers 141, 142, and 143, application programming interface (API) 150, and mediator server 161. Playback device 102 includes device memory 103, digital video disc 107, and device processor 106. Device memory 103 includes credential file 104 and device application 105. Digital video disc 107 includes disc application 108. Mediator server 161 includes processor 162 and memory 163. Memory 163 includes services list 164 and mediator application 165.

Display device 101 may be any type of visual output device such as a liquid crystal display (LCD) television, for example. Display device 101 may be connected to playback device 102 through a wireless or physical connection. Playback device 102 may be any type of device capable of presenting audio and visual contents stored in digital video disc 107 onto display device 101. In one embodiment as shown in FIG. 1, playback device 102 may be a Blu-ray Disc player. Device memory 103 may be any type of computer readable storage device. Credential file 104 may comprise any type of data file. Credential file 104 may store prior history information such as, for example, previously used account login information, including usernames and passwords for prior accessed third-party services. Credential file 104 may be encrypted or otherwise protected from unauthorized access. Device processor 106 may be any type of computing processor. Device application 105 may be a software application executed by device processor 106 to direct the behavior of playback device 102. Digital video disc 107 may comprise any type of optical data disc or another physical media format, such as a flash memory card. In one embodiment, digital video disc 107 may be a Blu-ray Disc. Disc application 108 may be a software application used by playback device 102 for media playback or to present other functionalities, such as menu options, from digital video disc 107.

In one embodiment, mediator server 161 may be any type of server machine. Processor 162 may be any type of processor. Memory 163 may be any type of machine-readable digital data storage device. Services list 164 may be an updatable data file comprising a list of third-party services presently recognized by mediator server 164. Mediator application 165 may be a software application executed and controlled by processor 162. Application programming interface 150 may comprise a data file containing a set of rules and specifications for implementing the interfaces of software applications. Both disc application 108 and mediator application 165 may be implemented in conformity to a common application programming interface 150. Accordingly, mediator server 161, using mediator application 165, and playback device 102, using disc application 108, may communicate through a common application programming interface 150. Accordingly, when mediator application 165 is updated to reflect additional functionalities, mediator application 165 may still fully communicate with device processor 106, executing disc application 108. In one embodiment, application programming interface 150 may reside within mediator server 161.

In one embodiment, network 140 may comprise any type of network, such as the Internet. Servers 141-143 may represent server hardware clusters or data centers connected to network 140. In one embodiment, servers 141-143 may host the third-party services listed in services list 164. In alternative embodiments, other servers (not shown) may host some third-party services listed in services list 164. Third-party services may be social networking services such as, for example, Facebook, Twitter, and Google Plus, respectively. In alternative embodiments, servers 141-143 may host other types of third-party services, for example e-commerce sites and other services.

In one embodiment, device processor 106, executing disc application 108, may send a service request for services list 164 through network 140 to mediator server 161, and mediator application 165 may be configured to receive, from playback device 102, that service request for services list 164 or a subset of the contents of services list 164. In the present embodiment, the general service request may be transmitted to request the entire services list 164. In other embodiments, a specific service request may be transmitted to request a subset of the contents of services list 164. As an example, a specific service request may seek a list of third-party services that may perform a specific function. That specific functionality may be the capability to allow users to create and retrieve an online cash account with a balance so the user may make online purchases, for example. The returned list of third-party services may include Amazon.com Inc. or any other e-commerce sites with similar functionalities but may not include social networking sites such as Facebook, for example. The specific functionality may be associated with a category in the metadata file, as will be explained below. Therefore, in alternative embodiments, service requests may be specific service requests that contain a specific functionality, and the associated transmitted services list may comprise contents associated with that specific functionality.

In the present embodiment, the service request may comprise a BD-Live (Blu-ray Disc Live) access request from playback device 102. When playback device 102 attempts to acquire any contents or features associated with digital video disc 107 across network 140 or to gain access to a third-party service across network 140, playback device 102 may transmit a BD-Live access request across network 140, as is known in the art. In alternative embodiments, a service request may comprise other types of access requests that may be transmitted to and received by mediator application 165.

In the present embodiment, mediator application 165 may be further configured to send services list 164 for presenting on display device 101 in response to receiving the service request from playback device 102. Sending services list 164 may cause mediator application 165 to duplicate services list 164 and send the duplicated service list 164 to playback device 102. In one embodiment, prior to sending services list 164, mediator application 165 may be further configured to dynamically update services list 164 to reflect a present availability of third-party services. Since some third-party services may be created and other third-party services may become inaccessible, service list 164 may require updating in order to reflect such changes. Device processor 106, executing disc application 108, may present services list 164 on display device 102 in response to receiving the services list 164. Device processor 106, executing disc application 108, may present services list 164 by displaying services list 164 through a built-in menu of digital video disc 107 or other graphical components. In one embodiment, sending services list 164 may further comprise delivering a metadata file associated with services list 164, wherein the metadata file comprises information categorizing the contents within services list 164.

In other embodiments, the metadata file may be initially and automatically transmitted to playback device 102 when the user accesses a main menu setting in order to populate the main menu with selectable categories. A category may be selected and such a selection may result in a specific service request requesting a subset of the list of third-party services listed in services list 164 matching the specific function associated with the category.

In the present embodiment, even if a transmitted services list contains less than all of the contents listed in services list 164, the metadata file may still contain all of the category information. Using the metadata file, device processor 106, using disc application 108, may display the contents of services list 164 in several categories based on, for example, the operational functionalities associated with the contents. In order to use display area economically, device processor 106 may not present all categories in the metadata list.

In one embodiment, after presenting services list 164 onto display device 101, device processor 106, executing disc application 108, may transmit an activation request for a third-party service listed in services list 164. Transmitting the activation request from playback device 102 may further comprise accessing credential file 104 in order to obtain an account login information. As previously explained, credential file 104 may contain prior history information including an account login information. The account login information may be stored within the activation request and transmitted to mediator server 161 to facilitate activating a third-party service from the mediator server 161.

In one embodiment, mediator application 165 may be configured to receive from playback device 102, an activation request for a third-party service listed in services list 164. In order for mediator application 165 to access a third-party service listed in services list 164, a user of playback device 102 may be initially required to create and send an activation request for that third-party service listed in services list 164 to mediator server 161. Descriptions for FIGS. 3a, 3b, and 3c below will further describe how to create an activation request. Mediator server 161, using mediator application 165, may activate that third-party service associated with the activation request in response to receiving the activation request. In this instance, the third-party service may be a social networking service, such as Facebook, for example. In one embodiment, mediator server 161, using mediator application 165, may activate the third-party service by establishing a connection to that third-party service, which may be hosted within any one of server 141-143 or within another location in network 140. In one embodiment, activating the third-party service may comprise mediator application 165, using the activation request, logging into a user account within that third-party service. As explained previously, an activation request may comprise an account login information, for example. In alternative embodiments, mediator server 161, using mediator application 165, may activate a third-party service by using the activation request to log into a plurality of user accounts of the third-party service. Some users may have multiple user accounts within the same third-party service, and mediator application 165 may use an appropriately created activation request to log into all of the multiple user accounts.

In one embodiment, whenever mediator server 161, using mediator application 165, successfully activates a third-party service, mediator server 161 may transmit a successful verification to playback device 102 through network 140. Device processor 106, executing disc application 108, may update display device 101 with a login success interface in response to receiving a successful verification of the activation request. The successful verification may be any type of appropriate digital notification. Login success interface may comprise a message regarding the successful activation of the third-party service. In the present embodiment, updating display device 101 in response to a successful verification may comprise storing an account login information of the activation request back into credential file 104 if such account login information does not already exist in credential file 104.

Figure 2:
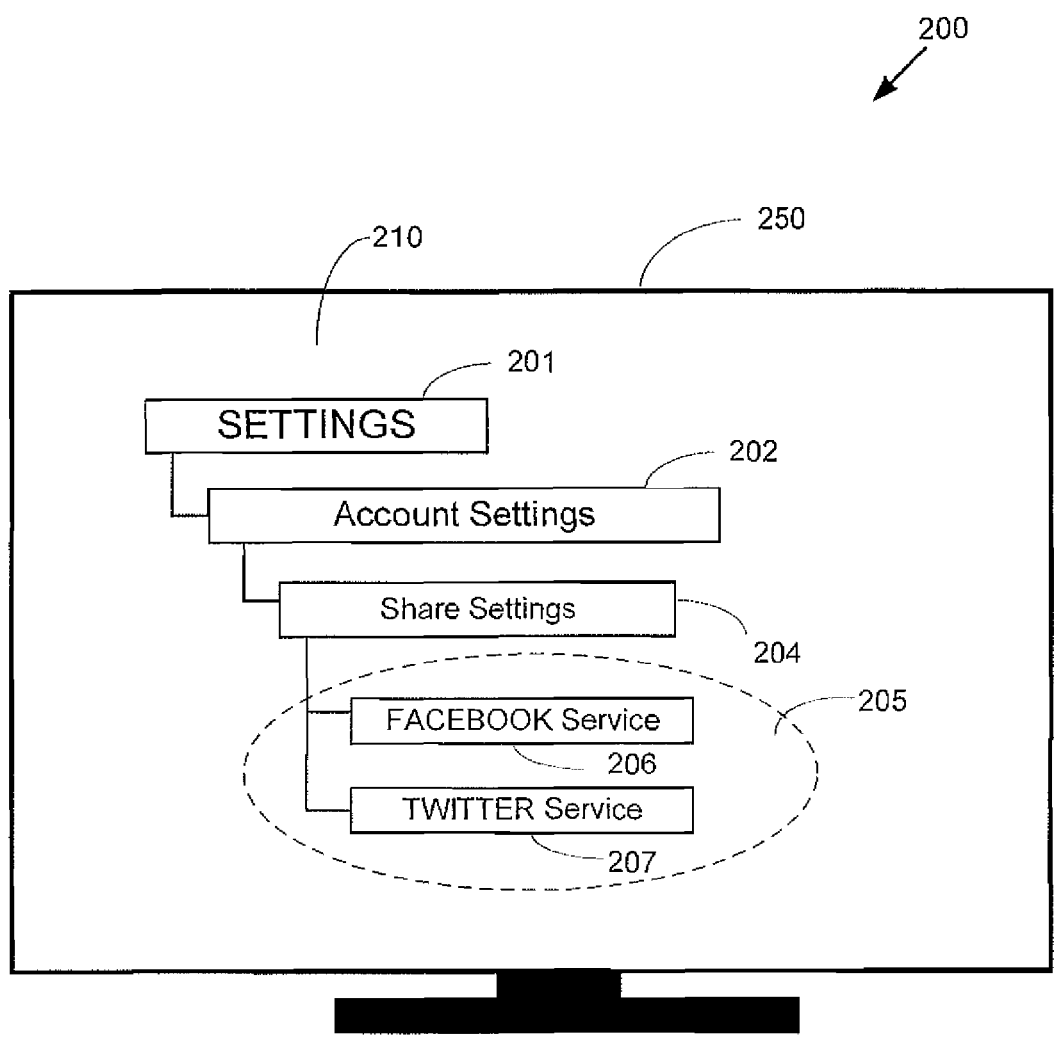
FIG. 2 presents a diagram of a menu displaying the services list transmitted to a playback device.

FIG. 2 presents a diagram of a menu displaying the services list transmitted to a playback device. Diagram 200 of FIG. 2 includes display device 250. Display device 250 includes menu 210. Menu 210 includes settings component 201, account settings component 202, share settings component 204, and plurality of service components 205. Plurality of service components 205 comprises service components 206 and 207. Display device 250 corresponds to display device 101 of FIG. 1.

In one embodiment, menu 210 may comprise a graphical user interface (GUI) of options shown on display device 250 while disc application 108 of FIG. 1 may be executing in playback device 102 of FIG. 1. Menu 210 may be a subsection of a main menu generated from digital video disc 107 of FIG. 1 using disc application 108 of FIG. 1. Thus, rather than being accessed through a separate application, the third-party services listed in services list 164 of FIG. 1 may be integrated directly into the built-in main or pop-up menus of digital video disc 107. Settings component 201 may be a graphical component of menu 210. Settings component 201 may be a conventional graphical drop down bar with additional components. Account settings component 202 may be another drop down bar within settings component 201. Share settings component 204 may also be a drop down bar under account settings component 202. Plurality of service components 205 may comprise the graphical presentation of services list 164 of FIG. 1. Each of service components 206 and 207 may comprise a graphical component associated with a third-party service listed in services list 164. Service components 206 or 207 may be used to cause mediator server 161 to access the associated third-party service that may be hosted on servers 141-143 of FIG. 1, or on any other locations connected to network 140 of FIG. 1.

As previously explained, device processor 106 of FIG. 1 may present services list 164 as plurality of service components 205 on display device 250. In the embodiment shown in FIG. 2, device processor 106 may present plurality of service components 205 through a built-in menu 210. Presently, services list 164 may contain a list of the Facebook and Twitter services. Thus, service components 206 and 207 may be associated with Facebook and Twitter services, respectively. In the present embodiment of the invention as shown in FIG. 2, service components 206 and 207 under share settings component 204 may only be used to cause mediator server 161 of FIG. 1 to activate the third-party services associated with service components 206 and 207. Other uses for the plurality of service components 205 may be performed at other areas of menu 210 or through other built-in pop-up menus of digital video disc 107.

In FIG. 2, share settings component 204 may represent a category of third-party services with the specific functionality to share contents, such as status updates, across a social network. No other categories are shown in FIG. 2. However, as previously explained, information for all available categories may be stored in the metadata file associated with services list 164 and transmitted to playback device 102. In alternative embodiments, a user may request account settings component 202 to display more categories in the metadata file, if any exists. The user may select any of these additional categories, which may be populated with contents listed in services list 164. Various categories may even comprise overlapping third-party service components. Therefore, in alternative embodiments, a user may have numerous categories to choose from in menu 210 in order to search for and activate a third-party service that can perform a desired functionality or service. As previously explained, the categories may be predetermined by mediator server 161 and each displayed category may represent a functionality or service with a list of associated third-party components. For example, the categories may include any e-commerce service, online banking service, movie streaming service, or any other types of services recognized by mediator server 161. Each of the displayed categories may be populated with additional relevant third-party components associated with existing third-party services.

Figure 3A:
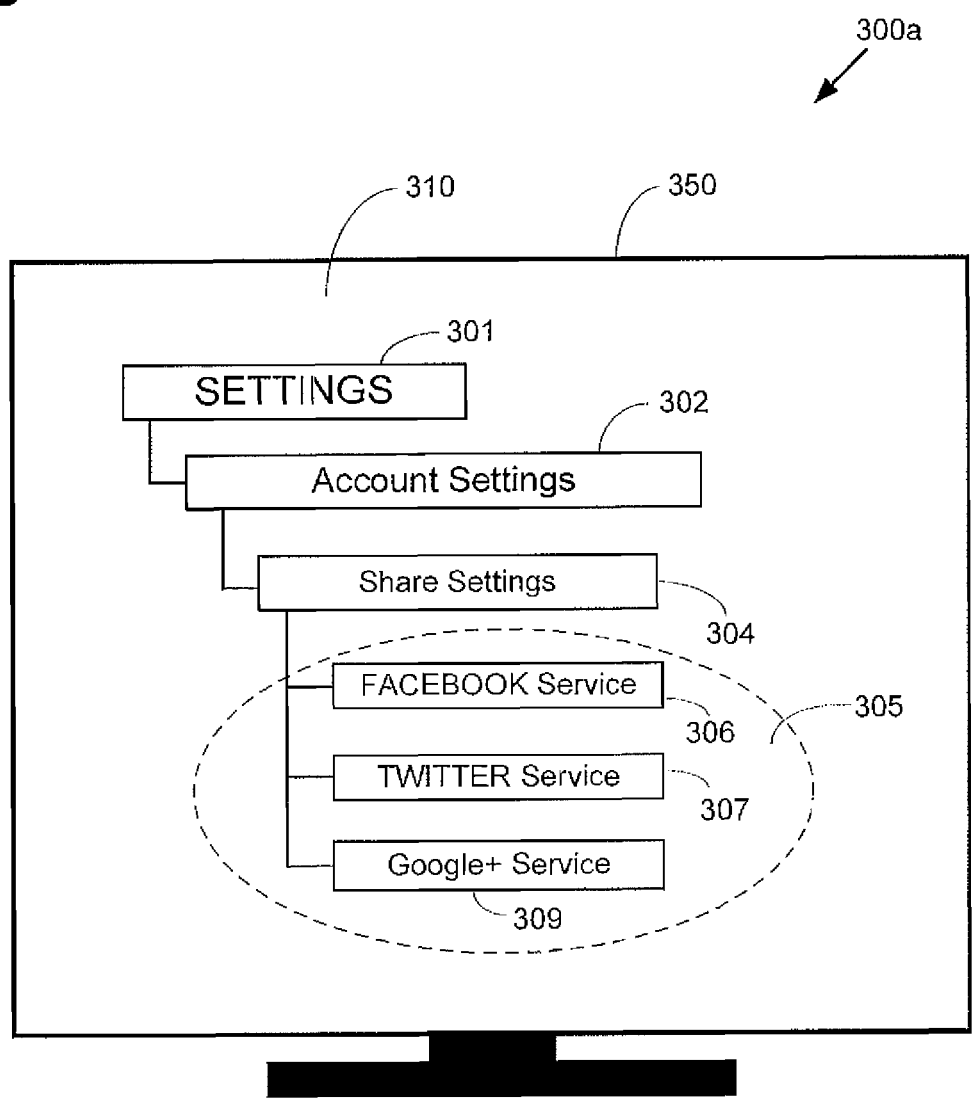
FIG. 3a presents a diagram of the menu from FIG. 2 presenting the updated services list, according to one embodiment of the present invention.

FIG. 3a presents a diagram of the menu from FIG. 2 presenting an updated services list, according to one embodiment of the present invention. Diagram 300a of FIG. 3 includes display device 350. Display device 350 includes menu 310. Menu 310 comprises settings component 301, account settings component 302, share settings component 304, and plurality of service components 305. Plurality of service components 305 comprises service components 306, 307, and 309. Display device 350, menu 310, settings component 301, account settings component 302, share settings component 304, and service components 306 and 307 may correspond to display device 250, menu 210, settings component 201, account settings component 202, share settings component 204, and service components 206 and 207 of FIG. 2, respectively.

Menu 310 may correspond to menu 210 of FIG. 2 being accessed at a later time. Mediator server 161 of FIG. 1 may have become aware of a new third-party service since the most recent access of services list 164, and services list 164 may be dynamically updated with new information to reflect a present availability of third-party services. Presently, device processor 106, executing disc application 108, may once again send a service request to mediator server 161 and may receive in return a dynamically updated services list 164. Accordingly, plurality of service components 305, being the graphical presentation of an updated services list 164, may also be different from plurality of service components 205 of FIG. 2. Plurality of service components 305 may comprise not only service components 306 and 307, but also service component 309. Service component 309 may be associated with a new third-party service, such as, for example, Google Plus service.

FIG. 3b presents a diagram of the menu from FIG. 3a displaying an activation interface for creating an activation request, according to one embodiment of the present invention. Diagram 300b of FIG. 3b includes display device 350. Display device 350 includes menu 310. Menu 310 includes settings component 301, account settings component 302, share settings component 304, service components 306, 307, and 309, and activation interface 320. With respect to FIG. 3b, elements with like numbers may correspond to similar elements in FIG. 3a.

In FIG. 3b, service component 306 may be selected for activation. As previously explained, in order to initially activate any third-party service, device processor 106 of FIG. 1, using disc application 108 of FIG. 1, may transmit an activation request to mediator server 161 of FIG. 1 for activating the third-party service associated with service component 306. In one embodiment, the activation request may be created using activation interface 320. Activation interface 320 may comprise GUI components that may allow the user to input any required information, such as credential information. The types of credential information required may be contained in services list 164 of FIG. 1. In one embodiment, activation interface 320 may provide text fields for inputting a username and password of a user account of a third-party service. Activation request may be created to contain the username and password. Once the activation request is transmitted to mediator server 161, mediator application 165 may activate the third-party service associated with service component 306 by using the activation request to log into an account within that third-party service. In the present embodiment, device processor 106 may obtain the username, password and other relevant credential information from credential file 104 and automatically input the username, password, and other relevant credential information into activation interface 320.

FIG. 3c presents a diagram of the menu from FIG. 3b displaying a login success interface in response to a successful verification of an activation request, according to one embodiment of the present invention. Diagram 300c of FIG. 3c includes display device 350. Display device 350 includes menu 310. Menu 310 includes settings component 301, account settings component 302, share settings component 304, service components 306, 307, and 309, and login success interface 321. With respect to FIG. 3c, elements with like numbers may correspond to similar elements in FIG. 3a.

Mediator server 161 of FIG. 1, using mediator application 165 of FIG. 1, may be configured to transmit a successful verification to playback device 102 of FIG. 1 upon successfully activating the third-party service associated with service components 306. As explained previously, a successful activation may entail that third-party service successfully verifying the activation request and allowing mediator server 161 to log into a user account of that third-party service. Accordingly, upon a successful verification, mediator server 161 may establish access to a user account within that third-party service.

Playback device 102, upon receiving the successful verification, may update display device 350 with login success interface 321. If service component 306 may have already been activated or activation results in failure, then service component 306 may simply display a message stating that activation for the associated third-party service has previously been performed or has presently failed. In one embodiment, service components 306, 307, and 309 may only be used to activate or deactivated their associated third-party services under menu 310.

Figure 4A:
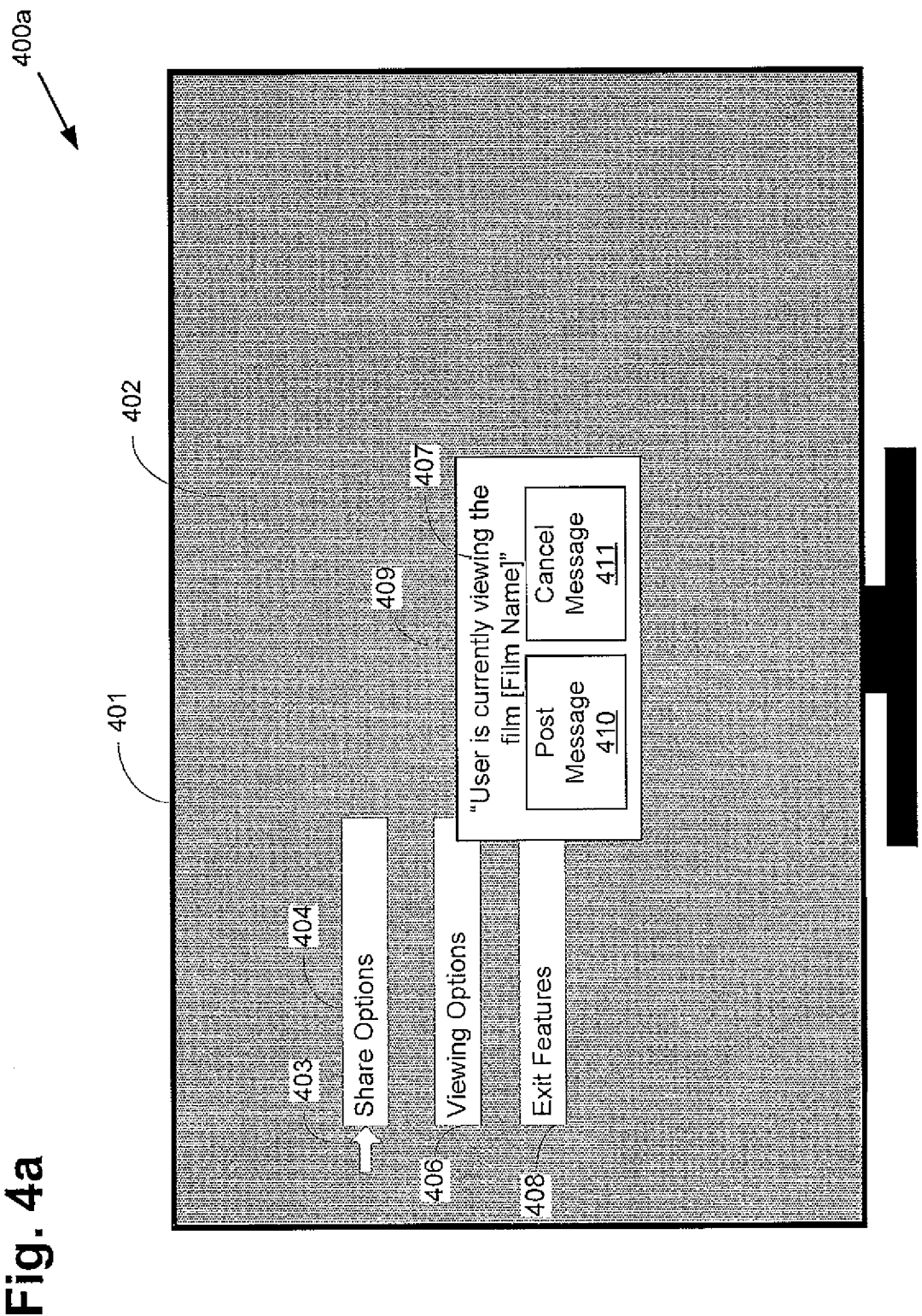
FIG. 4a presents a diagram of a display device displaying a pop-up menu and a text message dialog, according to one embodiment of the present invention.

FIG. 4a presents a diagram of a display device displaying a pop-up menu and a text message dialog, according to one embodiment of the present invention. Diagram 400a of FIG. 4a includes display device 401. Display device 401 includes movie scene 402, selection cursor 403, share button 404, viewing options button 406, exit button 408, and text message dialog 409. Text message dialog 409 includes individual message 407, post message button 410, and cancel button 411. Display device 401 may correspond to display device 101 of FIG. 1.

Mediator application 165 of FIG. 1 may be further configured to implement a user induced interaction for a third-party service that has been activated. The user induced interaction may comprise posting a public status update or any other interactive actions allowed by the plurality of service components during playback of content from digital video disc 107 of FIG. 1 in playback device 102 of FIG. 1. Together, share button 404, viewing options button 406, and exit button 408 may comprise a pop-up menu that may be accessible while playback device 102 may be presenting movie scene 402 from digital video disc 107. Share button 404, viewing options button 406, and exit button 408 may be any type of conventional graphical button. Share button 404 may be used to share a text message or post a status update with any third-party services that may be activated. Using share button 404 may cause text message dialog 409, containing a predetermined message, to appear. Individual message 407 may be used to replace any predetermined messages in text message dialog 409. Post message button 410, which may be any type of graphical button, may be used to cause mediator application 165 to post individual message 407 into a third-party service. In the present embodiment, the user may direct pop-up menu to display additional buttons corresponding to additional categories from the metadata file associated with services list 164 of FIG. 1.

Figure 4B:
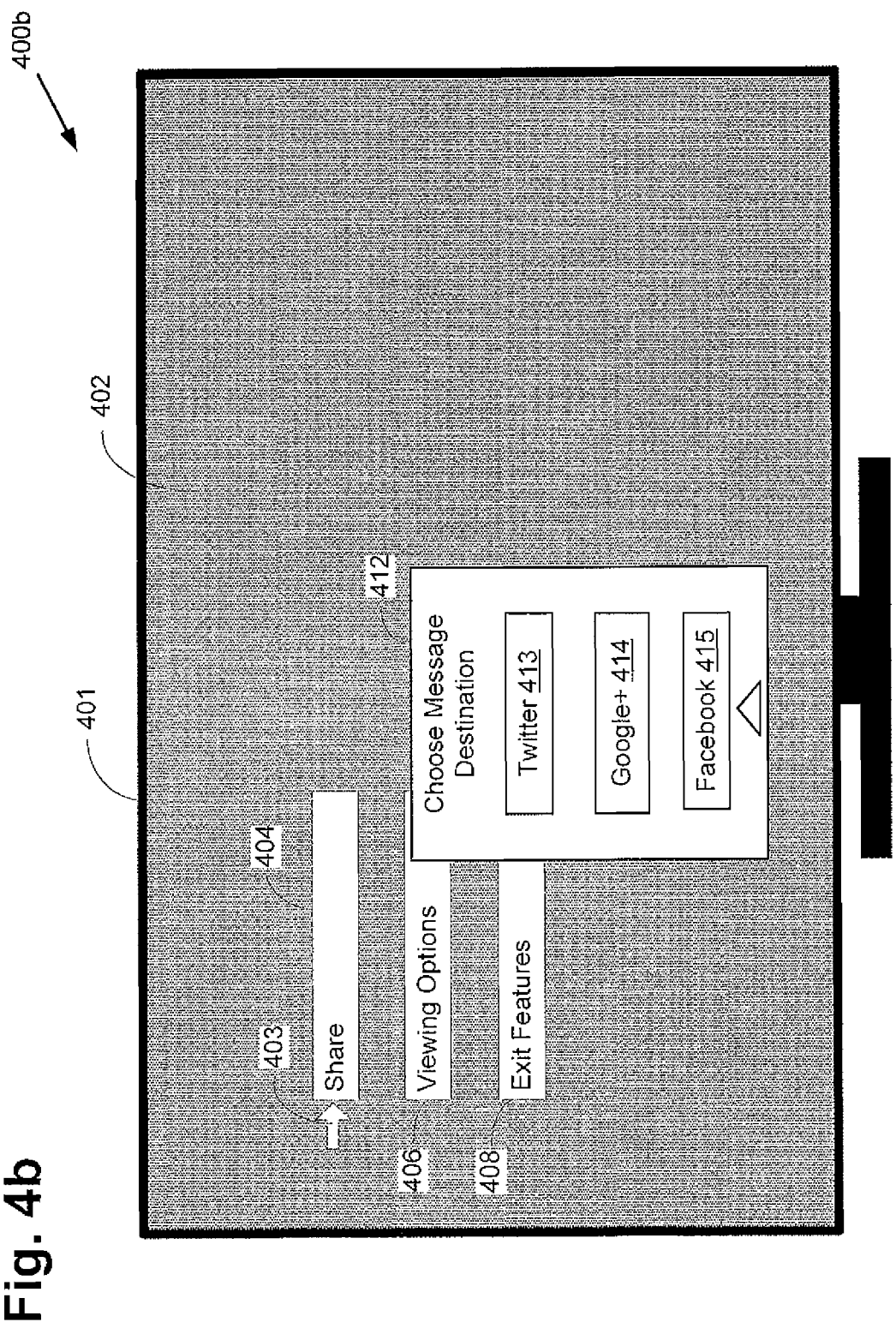
FIG. 4b presents a diagram of a display device displaying the pop-up menu from FIG. 4a and a services interface, according to one embodiment of the present invention.

FIG. 4b presents a diagram of a display device displaying the pop-up menu from FIG. 4a and a services interface, according to one embodiment of the present invention. Diagram 400b of FIG. 4b includes display device 401. Display device 401 includes movie scene 402, selection cursor 403, share button 404, viewing options button 406, exit button 408, and services interface 412. Services interface 412 includes service components 413, 414, and 415. With respect to FIG. 4b, elements with like numbers may correspond to similar elements in FIG. 4a.

In one embodiment, after using post message button 410 in FIG. 4a, services interface 412 may appear. Any combination of service components 413-415 may be selected to cause mediator application 165 of FIG. 1 to transmit individual message 407 of FIG. 4a to the third-party services associated with the selected service components 413-415. In one embodiment, service component 413 may be associated with Twitter, service component 414 may be associated with Google Plus, and service component 415 may be associated with Facebook. In one embodiment, service component 415 may be selected to receive individual message 407. Such a selection may cause mediator server 161 of FIG. 1 to post individual message 407 into an account in Facebook.

Figure 4C:
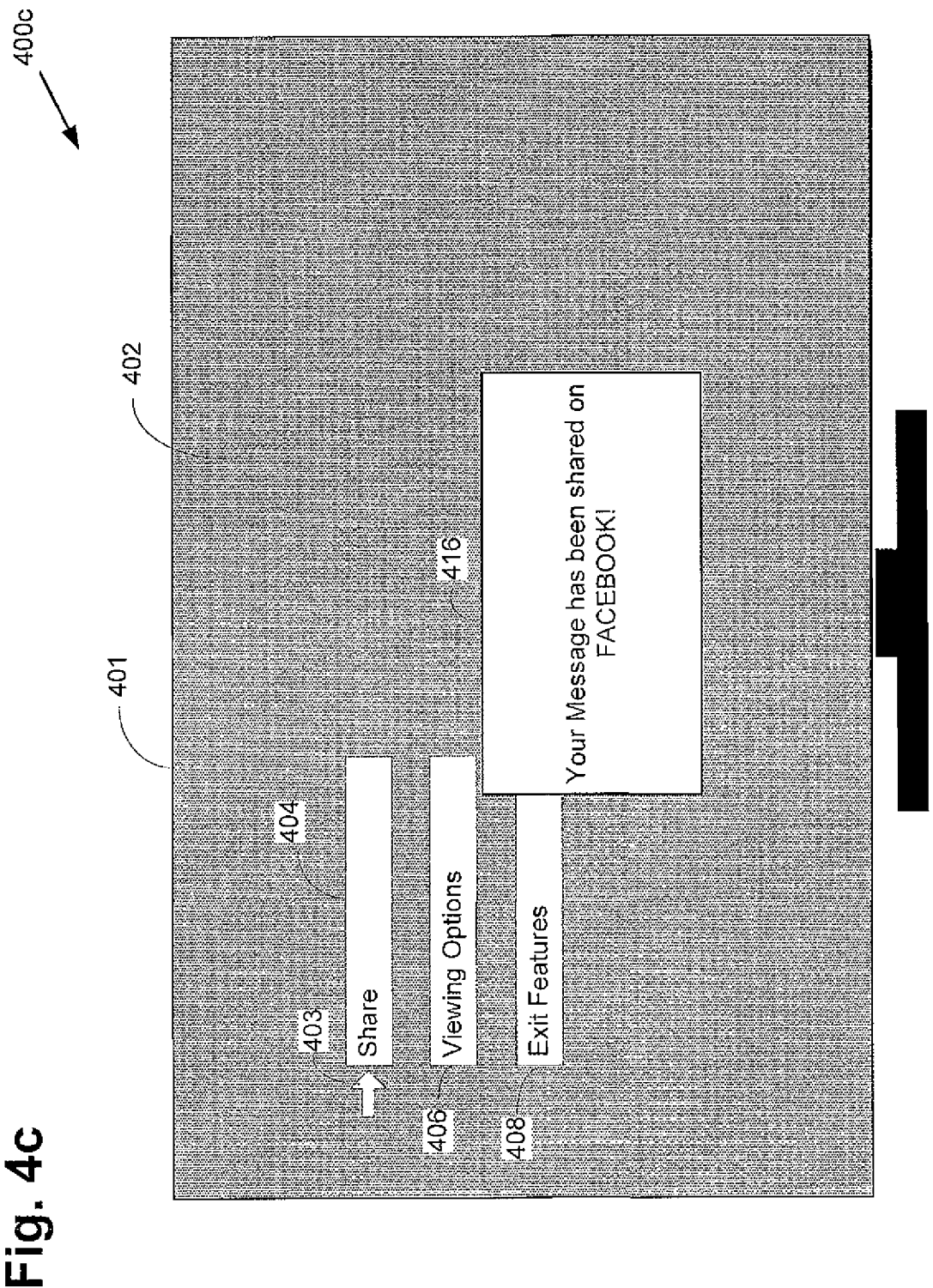
FIG. 4c presents a diagram of a display device displaying the pop-up menu from FIG. 4b and a success dialog, according to one embodiment of the present invention.

FIG. 4c presents a diagram of a display device displaying the pop-up menu from FIG. 4b and a success dialog, according to one embodiment of the present invention. Diagram 400c of FIG. 4c includes display device 401. Display device 401 includes movie scene 402, selection cursor 403, share button 404, viewing options button 406, exit button 408, and success dialog 416. With respect to FIG. 4c, elements with like numbers may correspond to similar elements in FIG. 4a.

When mediator application 165 of FIG. 1 successfully implements a user induced interaction such as posting a status update by using service components 413-415 of FIG. 4b, the status update may be displayed in the appropriate third-party services, such as a social networking service like Facebook, for example, and success dialog 416 may appear within display device 401. Success dialog 416 may be any type of dialog with a text message indicating a successful implementing of the user induced interaction. In one embodiment, if mediator server 161 fails to post the text message into the selected third-party service, then mediator server 161, using mediator application 165, may display an error message on display device 401. Furthermore, in one embodiment of the invention, if the selected third-party service has not been activated, then mediator server 161, using mediator application 165, may transmit a notification to playback device 102 indicating that the selected third-party service requires activation, and device processor 106 of FIG. 1 may automatically replace pop-up menu with display menu 310 of FIG. 3b in order to allow the user to create an activation request for a selected third-party service.

FIG. 5 shows a flowchart describing the steps, according to one embodiment of the invention, by which a services list may be transmitted to a playback device, according to one embodiment of the present invention. Certain details and features have been left out of flowchart 500 that are apparent to a person of ordinary skill in the art. Thus, a step may comprise one or more sub-steps or may involve specialized equipment or materials, for example, as known the art. While steps 510 through 540 indicated in flowchart 500 are sufficient to describe one embodiment of the present method, other embodiments may utilize steps different from those shown in flowchart 500, or may include more, or fewer steps.

Referring to step 510 of flowchart 500 in FIG. 5 and environment 100 of FIG. 1, step 510 of flowchart 500 comprises mediator application 165 receiving, from playback device 102, a service request for services list 164. As previously explained, a service request, such as a BD-Live access request, for example, may contain a request services list 164 in mediator server 161.

Referring to step 520 of flowchart 500 in FIG. 5, environment 100 of FIG. 1, step 520 of flowchart 500 comprises mediator application 165 sending services list 164 for presenting on display device 101 in response to receiving the service request from step 510. As previously explained, mediator server 161, using mediator application 165, may transmit services list 164 to playback device 102 in response to receiving service request. Mediator server 161 may create an exact duplicate of services list 164 to send to playback device 161.

Referring to step 530 of flowchart 500 in FIG. 5, environment 100 of FIG. 1 and diagram 300b of FIG. 3b, step 530 of flowchart 500 comprises mediator application 165 receiving an activation request for a third-party service listed in services list 164. As previously explained, playback device 102 may transmit an activation request to mediator server 161. The activation request may be associated with a particular third-party service listed in services list 164.

Referring to step 540 of flowchart 500 in FIG. 5, environment 100 of FIG. 1, step 540 of flowchart 500 comprises mediator application 165 activating a third-party service in response to receiving the activation request from step 530. As previously explained, mediator application 165 may use information contained in the activation request to connect to the third-party service associated with the activation request by logging into an account within that third-party service.

Thus, a system and method for transmitting a services list to a playback device for a digital video disc has been disclosed. By storing an updatable services list containing information on available third-party services, mediator server may send such services list to playback device in order for playback device to present a list of dynamically adjustable third-party services for a digital video disc on a display device. Accordingly, by programming a digital video disc such as a Blu-ray disc according to an API using a mediator server, a dynamically adjustable services list may be supported without changing the disc application code.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangement, modifications, and substitutions without departing from the scope of the invention.

What is claimed is:

1. A playback device comprising:
a processor configured to:
send, to a server, a service request for a list of services including a plurality of social networking services that are available for a digital video disc being played by the playback device;
receive, from the server, the list of services including the plurality of social networking services, in response to sending the service request;
send, to the server, an activation request for a first social networking service selected from the plurality of social networking services received from the server; and
send, to the server, a message from a user to be posted on the first social networking service, after activation of the first social networking service in response to sending the activation request.

2. The playback device of claim 1, wherein prior to sending the activation request, the processor is further configured to present the list of services to the user using a built-in menu of the digital video disc.

3. The playback device of claim 1, wherein the processor is further configured to store an account login information of the activation request into a credential file.

4. The playback device of claim 1, wherein the activation request is further for a second social networking service selected from the plurality of social networking services, and wherein the message from the user is to be posted on the second social networking service in addition to the first social networking service.

5. The playback device of claim 4, wherein the activation request includes user accounts information for logging into the first social networking service and the second social networking service.

6. A method for use by a playback device, the method comprising:
- sending, to a server, a service request for a list of services including a plurality of social networking services that are available for a digital video disc being played by the playback device;
- receiving, from the server, the list of services including the plurality of social networking services, in response to sending the service request;
- sending, to the server, an activation request for a first social networking service selected from the plurality of social networking services received from the server; and
- sending, to the server, a message from a user to be posted on the first social networking service, after activation of the first social networking service in response to sending the activation request.

7. The method of claim 6, wherein prior to the sending of the activation request, the method further comprises presenting the list of services to the user using a built-in menu of the digital video disc.

8. The method of claim 6 further comprising storing an account login information of the activation request into a credential file.

9. The method of claim 6, wherein the activation request is further for a second social networking service selected from the plurality of social networking services, and wherein the message from the user is to be posted on the second social networking service in addition to the first social networking service.

10. The method of claim 9, wherein the activation request includes user accounts information for logging into the first social networking service and the second social networking service.

11. A server comprising:
a processor configured to:
- receive, from a playback device, a service request for a list of services including a plurality of social networking services that are available for a digital video disc being played by the playback device;
- send, to the playback device, the list of services including the plurality of social networking services, in response to receiving the service request;
- receive, from the playback device, an activation request for a first social networking service selected from the plurality of social networking services sent by the server; and
- receive, from the playback device, a message from a user to be posted on the first social networking service, after activation of the first social networking service in response to receiving the activation request.

12. The server of claim 11, wherein the activation request is further for a second social networking service selected from the plurality of social networking services, and wherein the message from the user is to be posted on the second social networking service in addition to the first social networking service.

13. The server of claim 12, wherein the activation request includes user accounts information for logging into the first social networking service and the second social networking service.

14. The server of claim 11, wherein the activation includes using the activation request to log into a user account of the first social networking service.

15. The server of claim 11, wherein the service request comprises a BD-Live access request from the playback device.

* * * * *